Figure 1A:
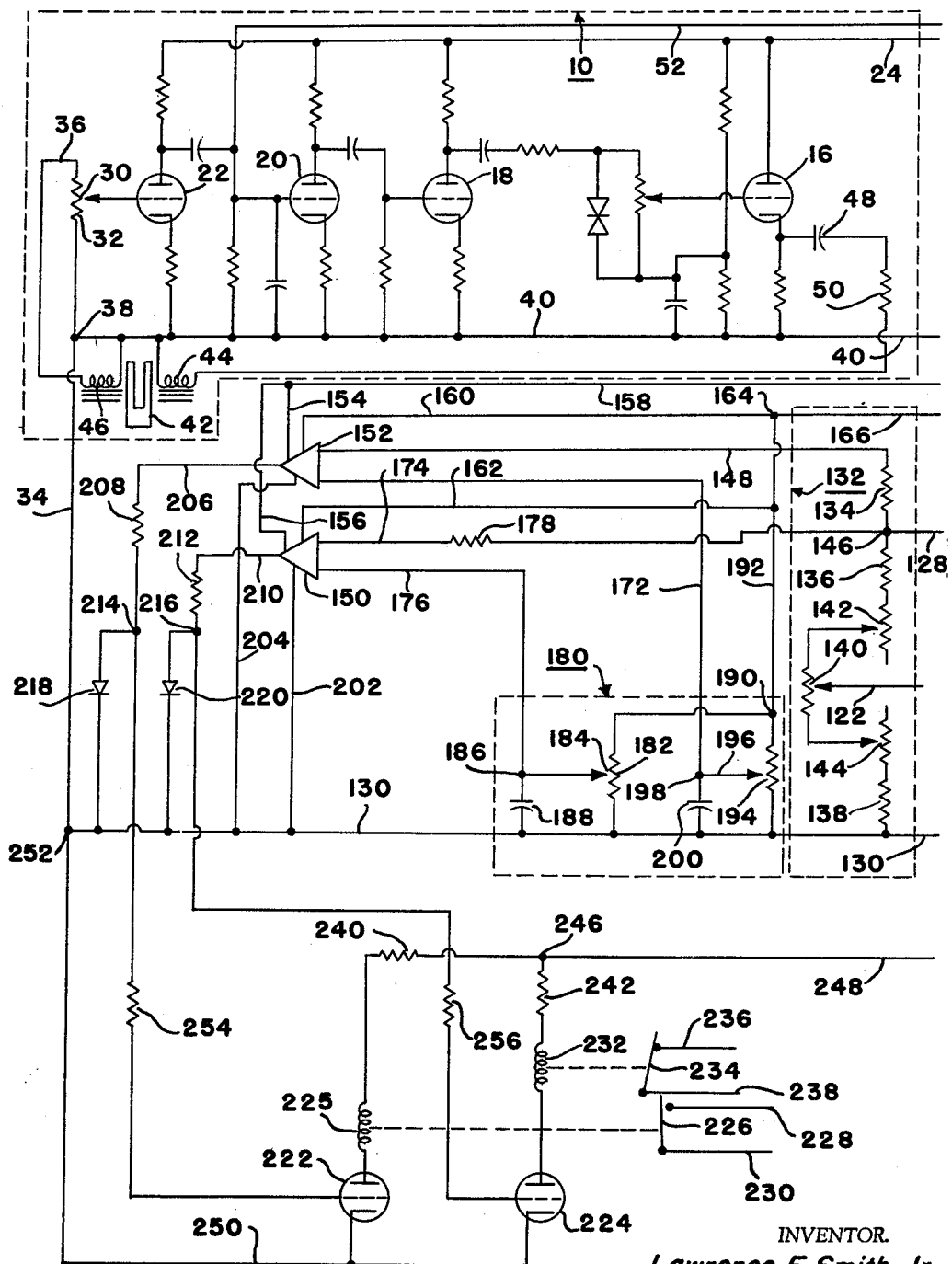

June 29, 1965   L. E. SMITH, JR   3,192,325
HORN PROJECTOR TESTER
Filed May 15, 1961   2 Sheets-Sheet 1

INVENTOR.
Lawrence E. Smith, Jr.
BY
C. R. Meland
His Attorney

INVENTOR.
Lawrence E. Smith, Jr.
BY C. R. Meland
His Attorney

United States Patent Office 3,192,325
Patented June 29, 1965

3,192,325
HORN PROJECTOR TESTER
Lawrence E. Smith, Jr., Anderson, Ind., assignor to General Motors Corporation, Detroit, Mich., a corporation of Delaware
Filed May 15, 1961, Ser. No. 109,961
12 Claims. (Cl. 179—175.1)

This invention relates to a system for checking horn projectors and similar devices for leaks.

One of the objects of this invention is to provide a method for checking horn projectors or similar devices for leaks wherein a pair of speakers or transducers are driven by a fixed frequency oscillator. The speakers are each aligned respectively with a horn projector, one of which is known to have no leaks and the other of which is to be tested. The comparative amount of air column loading of each speaker indicates whether or not the horn being tested is acceptable. If the loading of the two speakers is substantially equal, it indicates that the horn being tested is equal in quality to the standard horn which is known to be acceptable. If the loading is not equal, it indicates that the horn projector under test has leaks.

Another object of this invention is to provide an electrical system for testing horn projectors or the like wherein a pair of speakers are driven from a fixed frequency oscillator and wherein means are provided for comparing the loading of the speakers.

Further objects and advantages of the present invention will be apparent from the following description, reference being had to the accompanying drawings wherein preferred embodiments of the present invention are clearly shown.

Figure 1B:
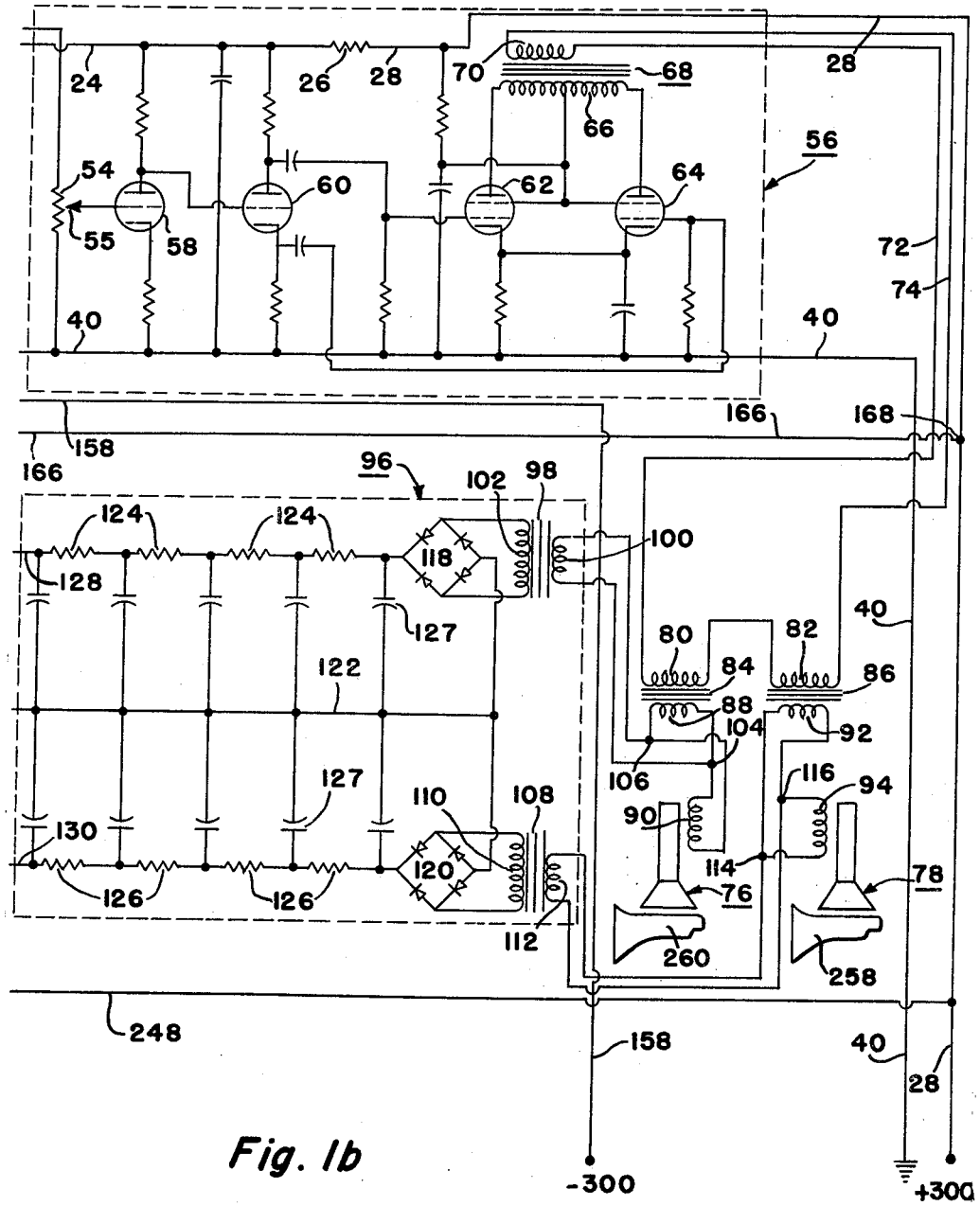

In the drawings:

FIGURES 1a and 1b when taken together are a schematic illustration of a horn testing system made in accordance with this invention.

Referring now to the drawings and more particularly to FIGURE 1a, the reference numeral 10 is used to designate a fixed frequency oscillator which is enclosed in dotted lines. This oscillator includes the triode tubes 16, 18, 20 and 22 which may be of the 6201 type. The plates of the tubes 16 through 22 are connected with the lead wire 24 through suitable resistances as shown. The lead wire 24 is connected with a resistor 26 and it is seen that this resistor is connected with lead wire 28. The lead wire 28 is connected with a positive 300 volts from a suitable power supply as is illustrated in FIGURE 1b.

The grid of the tube 22 is connected with a shiftable tap 30 on a potentiometer resistor 32. One side of the resistor 32 is connected with lead wire 34 whereas an opposite side of this potentiometer resistor 32 is connected with lead wire 36. The cathode of tube 22 is connected with junction 38 and also with a lead wire 40 which is at ground potential.

The fixed frequency oscillator further includes a tuning fork 42 which is driven by a suitable magnetic device that is operated in accordance with signals developed across a coil winding 44. The tuning fork drives another magnetic member which causes signals to be produced in the coil winding 46 which is connected between junction 38 and one side of the potentiometer resistor 32. The coil winding 44 has one side thereof connected with lead wire 40 and has an opposite side connected with the cathode of tube 16 via resistor 50 and capacitor 48.

The output of the fixed frequency oscillator 10 is delivered to a potentiometer resistor 54 via the lead wire 52. This potentiometer resistor 54 with the tap 55 provides the input to a driver amplifier which is shown in dotted lines and which is generally designated by reference numeral 56. This driver amplifier is illustrated in FIGURE 1b and it is seen that it includes triode tubes 58 and 60 which may be of the 5963 type. It can be seen that the output of tube 58 is coupled to the input of tube 60 and that the tube 60 drives tubes 62 and 64 which are connected in a push-pull arrangement and which preferably are 6AQ5 tubes. The plates of tubes 62 and 64 are connected with a center tapped primary winding 66 of the transformer 68. The secondary winding 70 of the transformer 68 is connected with lead wires 72 and 74 and these two lead wires provide the output from the driver amplifier 56.

The driver amplifier drives a pair of transducers or speakers which are identical and which are designated respectively by reference numerals 76 and 78. The lead wires 72 and 74 which form the output of the driver amplifier 56 are connected with the primary windings 80 and 82 of output transformers 84 and 86. It is seen that the primary windings 80 and 82 are connected together so that they are driven in series. The secondary winding 88 of the output transformer 84 is connected in series with the voice coil 90 of speaker 76 whereas the secondary winding 92 of output transformer 86 is connected with the voice coil 94 of speaker 78. It can be seen from the foregoing that the speakers 76 and 78 are driven in series and will be driven at the same fixed frequency.

The system of this invention is provided with means for sampling the signal input to the speakers 76 and 78 and for stepping up and rectifying this signal voltage. To this end, a voltage transformation, rectification and filter network is provided which is designated in its entirety by reference numeral 96 and which is enclosed in the dotted lines of FIGURE 1b. This voltage transformation, rectification and filter network includes a transformer 98 having a primary winding 100 and a secondary winding 102. The primary winding 100 is connected with junctions 104 and 106. Another transformer 108 is provided which has a secondary winding 110 and a primary winding 112. The primary winding 112 of transformer 108 is connected with the junctions 114 and 116. It can be seen that the connections of the primary windings 100 and 112 with the speakers is such that these primary windings will sample the signal being supplied to the speakers 76 and 78. The signals delivered to primary windings 100 and 112 will divide in accordance with the amount of load being handled by each speaker.

The secondary winding 102 of transformer 98 is connected with a full wave bridge rectifier 118 and in a similar fashion, the secondary winding 110 is connected with bridge rectifier 120. One D.C. terminal of each bridge rectifier is connected with the lead wire 122. The other D.C. terminal of bridge rectifier 118 is connected in series with a plurality of resistors which are each designated by reference numeral 124. The other D.C. output terminal of bridge rectifier 120 in a similar fashion is connected in series with the series-connected resistors 126. A plurality of filter condensers 127 are connected between lead wire 122 and the output side of the bridge rectifiers 118 and 120 and also between lead wire 122 and the various junctions formed by the series connected resistors 124 and 126.

The output of network 96 is taken off from lead wires 128, 122 and 130. The three lead wires 122, 128 and 130 extend into a balance and summing network which is generally designated by reference numeral 132 and which is illustrated in FIGURE 1a. This balancing and summing network includes resistors 134, 136, and 138 together with potentiometer resistors 140, 142, and 144. The shiftable tap of potentiometer resistor 140 is connected with lead wire 122 whereas the shiftable tap of potentiometer resistors 142 and 144 are connected respectively with the opposite sides of potentiometer resistor 140. The lead wire 128 is connected with a junction 146 whereas the lead wire 130 is connected to one side of resistor 138. One side of resistor 134 is connected with the lead wire 148 as is clearly apparent from the drawing.

It will be appreciated that if the D.C. output of the bridge rectifiers 118 and 120 is equal, there will be no difference in potential between the junction 146 and the lead wire 130. It will also be appreciated that if one of the bridge rectifiers has a greater output than the other, a difference of potential will exist between junction 146 and lead wire 130. It therefore is seen that if the voltage outputs of the bridge rectifiers 118 and 120 is equal, it indicates a balanced condition with the speakers 76 and 78 equally dividing the load. Differences in potential between junction 146 and lead wire 130 will indicate an unequal division of the load between speakers 76 and 78. This is an important feature of this invention as will be more fully described hereinafter.

The output of the balance and summing network 132 is fed to a pair of amplifiers of the analog type which are shown schematically in FIGURE 1a and which are designated respectively by reference numerals 150 and 152. The amplifiers 150 and 152 are connected with a negative 300 volts via lead wires 154 and 156 together with the common lead wire 158 that is connected to the negative 300 volts. The amplifiers 150 and 152 are also connected to the positive 300 volt line via lead wires 160 and 162 which are connected together at junction 164. This junction 164 is connected with lead wire 166 which in turn is connected with junction 168 and thus is connected with the positive 300 volts via lead wire 28.

The input information to amplifier 152 is fed to it between lead wires 148 and 172, the lead wire 148 being connected to junction 146 through resistor 134. The input information to amplifier 150 is fed to it through lead wires 174 and 176. The lead wire 174 is connected with junction 146 through the resistor 178. The lead wires 172 and 176 which form one of the input terminals to the amplifiers 152 and 150 are connected with circuit 180 which is operative to set the switching level for the amplifiers 150 and 152.

The circuit 180 includes the potentiometer resistor 182 having a shiftable tap 184 that is connected with junction 186. Junction 186 is connected with lead wire 176 and with the capacitor 188. The potentiometer resistor 182 is connected between lead wire 130 and the junction 190. The junction 190 is connected with lead wire 192 which in turn is connected with junction 164. A second potentiometer resistor 194 is provided having a shiftable tap 196 which is connected with junction 198. The junction 198 is connected with lead wire 172 and a capacitor 200 is connected between junction 198 and the lead wire 130. The network 180 may be adjusted so as to control the switching level of the amplifiers 150 and 152. This switching level is adjusted for a particular amplifier by adjusting either tap 184 or tap 196.

The amplifiers 150 and 152 are connected with lead wire 130 via lead wires 202 and 204. The output of amplifier 152 is fed to a lead wire 206 connected in series with resistor 208. The output of amplifier 150 is connected with lead wire 210 which is connected in series with resistor 212. One side of resistor 208 is connected with junction 214 and in a similar fashion one side of resistor 212 is connected with junction 216. The junctions 214 and 216 are clamped to the voltage of lead wire 130 by means of the clamping diodes 218 and 220.

The logic circuit for the testing system of this invention comprisse a pair of 6SN7 tubes 222 and 225. The plate of tube 222 is connected in series with a plate relay coil 224 which operates a relay contactor 226. The relay contactor 226 controls the connection of lead wires 228 and 230. In a similar fashion, the plate of tube 224 is connected in series with a plate current relay 232 which controls the operation of contactor 234. The contactor 234 in turn controls the connection of lead wires 236 and 238. The relay coil 225 is connected in series with resistor 240 whereas the relay coil 232 is connected in series with resistor 242. The opposite sides of resistors 240 and 242 are connected with junction 246 and junction 246 is connected with lead wire 248 which is supplied with a positive 300 volts from lead wire 28.

The cathodes of tubes 222 and 224 are both connected with lead wire 250 and it is seen that this lead wire is connected with junction 252 which forms a common connecting point for lead wires 34, 130 and 250. The grid of tube 222 is connected with junction 214 via resistor 254 whereas the grid of tube 224 is connected with junction 216 via resistor 256.

The system that has just been described is operative to test devices such as a horn projector for leaks. In testing a horn projector for leaks, a horn projector is selected which is known to have no leaks and which therefore becomes a standard horn projector. This standard horn projector is designated by reference numeral 258 in FIGURE 1b and the open mouth of the horn projector is positioned so that it is aligned with the open mouth of the speaker 78. To be more specific, the horn projector 258 may be of the type illustrated in the patent to White 2,803,004. It can be seen that when a horn projector is placed in direct alignment with the speaker 78, the vibrations of the vibrating part of the speaker or transducer 78 will set up varying air pressures which are applied to the interior of the horn projector 258.

The horn projector 258 being a horn projector that has no leaks, will be similar to an impervious tube having an open mouth which faces the speaker 78 and another open end which is at atmospheric pressure.

If it is assumed that the horn projector 258 is of good quality and therefore may be used as a standard, the system is now ready to test other horn projectors to compare their quality with the standard horn projector 258. When it is desired to test aonther horn projector, the other horn projector is then placed in alignment with the speaker 76. In FIGURE 1b, the other horn projector to be tested has been designated by reference numeral 260 and it will be understood that this horn projector is the same construction as horn 258.

With the standard horn projector 258 and the horn projector 260 to be tested now in place, the circuit is energized so that the fixed frequency oscillator 10 delivers a predetermined output frequency. This frequency may be, for example, in the neighborhood of 204 cycles per second. The output of the oscillator 10 is fed to the power amplifier 56 where the power is stepped up to a point sufficient to drive the speakers 76 and 78. If it is assumed that the horn projector 260 has no leaks the air column load on speakers 76 and 78 is identical and the output voltage of bridge rectifiers 118 and 120 will be substantially identical. Since the output voltage of bridge rectifiers 118 and 120 is substantially identical, there is no potential difference between junction 146 and lead wire 130 so that neither amplifier 150 nor 152 will be switched to change the grid voltage of tubes 222 and 224. As a result, there will be no change in the shifting of contactors 226 and 234 and this balance or null condition will indicate that the horn projector 260 is of the same quality as horn projector 258 and has no leaks.

If it is assumed that the horn projector 260 that was placed in front of speaker 76 does have some leaks, the air column load on speakers 76 and 78 will not be equal. This will cause the bridge rectifiers 118 and 120 to have different output voltages and therefore will cause a difference in potential between junctions 146 and 130. If this difference of potential is of a predetermined value as determined by network 180, the amplifiers 150 and 152 will be switched to cause a change in grid voltage in tubes 222 and 224 and thus cause the relay coils 224 and 232 to be energized. The contactors 226 and 234 will therefore be shifted and a different logic output will be obtained than when the system was in a balanced condition. It is pointed out that the lead wires 236 and 238 and lead wires 228 and 230 can be used in many ways as an indication that the horn projector 260 does not meet the standard of horn projector 258. These lead wires could be used to control suitable indicating means such as lights or can be used to actually perform operations on an automated setup that would continuously feed horns into alignment with speaker 76. In other words, the contactors 226 and 234 may be actually used to perform operations on a horn that is not acceptable.

The amplifiers 150 and 152 will cause changes in grid voltage of tubes 222 and 224 when the voltage exceeds a zero value by a predetermined amount or is less than this zero value by a predetermined amount. Thus, an error voltage of plus or minus one volt may be, for example, an acceptable deviation. An excess of a positive one volt may indicate that there is no horn projector lined up with the speaker 78 and that there is an empty station. An error voltage of greater than minus one volt may indicate that the horn projector 260 has leaks and is therefore not accetpable.

In summary, it can be seen that a testing system has been provided wherein the variations in air column loading of a pair of speakers is used to indicate whether a device to be tested is acceptable or is up to standard as compared to a standard device that is known to be of good quality.

It is pointed out that this system could be used in testing for leaks in devices other than horns and could be used for testing any type of a tubular member that has an open mouth and another open end and which may be placed in front of a speaker or transducer.

While the embodiments of the present invention as herein disclosed constitute preferred forms, it is to be understood that other forms might be adopted.

What is claimed is as follows:

1. An electrical system comprising, a fixed frequency oscillator, power amplifier means having an input connected with said fixed frequency oscillator, first and second output transformers having their primary windings connected with the output of said power amplifier means, first and second speaker means each having a voice coil, said voice coils being connected respectively with the secondary windings of said output transformers, and circuit means having inputs connected across said voice coils for developing an error voltage when the loading of said speakers is unequal.

2. An electrical system for testing enclosures comprising, a source of electrical oscillations, first and second output transformers each having a primary winding and a secondary winding, means connecting the primary windings of said output transformers with said source of electrical oscillations, first and second speaker means each having a voice coil, means connecting the secondary windings of said output transformers respectively with said voice coils, means connected respectively across said voice coils for sensing the electrical loading of said voice coils, rectifier means connected respectively with said sensing means for providing two direct current voltages which are indicative of the electrical loading of said speakers, and circuit means connected with said rectifier means for combining said direct current voltages to provide a direct current error voltage when the electrical loading of said speakers is not equal.

3. An electrical system for testing enclosures by sensing and comparing the electrical loading of a pair of speakers comprising, a source of fixed frequency oscillations, first and second transformer means each having a primary winding and a secondary winding, means connecting said primary windings in series and with said source of electrical oscillations, first and second speaker means driven respectively by the secondary windings of said transformer means, first and second sensing means connected respectively with said secondary windings for sensing the electrical loading of said first and second speaker means, and means connected with said sensing means for developing a direct current error voltage when the electrical loading of said speaker is not equal.

4. An electrical system for developing an error voltage when the electrical loading of a pair of electrically energizable speakers is not equal comprising, a source of fixed frequency electrical oscillations, first and second output transformers each having a primary winding and a secondary winding, power amplifying means having an input connected with said source of electrical oscillations and having an output feeding both of said primary windings, first and second speaker means energized respectively from the secondary windings of said output transformers, first and second sensing means connected respectively with the secondary windings of said output transformers for sensing the electrical loading of said first and second speaker means, and means connected with said first and second sensing means including rectifiers for developing direct current voltages which are indicative of the amount of electrical loading of said first and second speaker means, and means for combining said direct current voltages to provide an error voltage only when the electrical loading of said speaker means is not equal.

5. A method of testing a device defining a hollow enclosure having an open end by means of an electrical oscillator which drives a pair of electrically energizable speakers, the steps comprising, placing a device of known quality in pressure transfer relationship with the pressure developing element of said one speaker, placing the device to be tested in pressure transfer relationship with the other speaker, and then measuring the electrical loading of each of said speakers.

6. A method of testing an automotive horn projector for leaks by means of an electrical energizable oscillator which electrically energizes two speakers, the steps comprising, placing the open end of a horn projector of known acceptable quality in pressure transfer relationship with one of said speakers, placing a horn projector of the same dimensions as the known horn projector in pressure transfer relationship with the other of said speakers, and then measuring the amount of electrical loading of each speaker.

7. An electrical system comprising, a source of fixed frequency electrical oscillations, first and second speaker means each having electrically energizable driving means connecting the electrically energizable driving means of each speaker means with said source of electrical oscillations, and means connected with said electrically energizable driving means of both speakers for developing an error voltage in accordance with unequal electrical loading of said speakers.

8. In combination, a source of electrical oscillations, first and second speaker means each having electrical energizable driving means, power amplifier means connected between said source of electrical oscillations, and the electrically energizable driving means of said first and second speaker means, and sensing means electrically connected with the electrically energizable driving means of said first and second speaker means for sensing the electrical loading of each electrically energizable driving means and for developing a direct current error voltage when the loading of said speaker means is not equal.

9. An electric system comprising, a source of electrical oscillations, first and second speaker means each having a voice coil, the voice coil of each of said speaker means being connected with said source of electrical oscillations, and means connected with the voice coils of said speaker means for developing a direct current error voltage when the loading of said speaker means is not equal.

10. An electrical system comprising, a fixed frequency electrical oscillator, first and second speakers each having a voice coil, circuit means connecting said voice coils of said speakers and said oscillator, a first sensing circuit connected across one of said voice coils for developing a first direct current output voltage, a second sensing circuit connected across the other voice coil for developing a second direct current output voltage, and a circuit for combining said first and second direct current output voltages and for developing an error voltage when said speakers are not equally loaded.

11. An electrical system comprising, a source of electrical oscillations having a fixed frequency output, first and second speaker means each having a voice coil connected in circuit with the output of said oscillator, means connected with the output of said voice coil of said first speaker means including first rectifier means for developing a first direct current voltage, means connected with the voice coil of said second speaker means including second rectifier means for developing a second direct current voltage, and means for developing a direct current output voltage that is the algebraic sum of the first and second voltages when the loading of said speaker means is not equal.

12. An electrical system comprising, a source of fixed frequency electrical oscillations, first and second speaker means each having a voice coil, power amplifier means having an input connected with said source of oscillations and having an output connected in circuit with both of said voice coils, means connected with the voice coil of said first speaker means including first bridge rectifier means for developing a first direct current voltage, means connected with the voice coil of said second speaker means including second bridge rectifier means for developing a second direct current voltage, and means for comparing said first and second voltages and for developing an error voltage when said speakers are not equally loaded.

References Cited by the Examiner
UNITED STATES PATENTS

| | | | |
|---|---|---|---|
| 1,555,318 | 9/25 | Sell | 179—175 |
| 1,816,917 | 8/31 | Smythe | 181—52 |
| 1,822,996 | 9/31 | Mirick | 179—175 |
| 2,377,275 | 5/45 | Smith | 324—57 |
| 2,535,681 | 12/50 | Johnson | 179—1 |
| 2,980,766 | 4/61 | Nulton et al. | 179—1 |

OTHER REFERENCES

Applied Acoustics, Olson and Massa, page 332; 1939, QC 22505.

ROBERT H. ROSE, *Primary Examiner.*

WILLIAM C. COOPER, *Examiner.*